United States Patent
Salanne et al.

(10) Patent No.: US 11,932,408 B2
(45) Date of Patent: Mar. 19, 2024

(54) HYBRID PROPULSION ASSEMBLY FOR AIRCRAFT

(71) Applicant: SAFRAN, Paris (FR)

(72) Inventors: Jean-Philippe Hervé Salanne, Moissy-Cramayel (FR); Stéphane Petibon, Moissy-Cramayel (FR); Florent Rougier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 462 days.

(21) Appl. No.: 17/274,542

(22) PCT Filed: Sep. 2, 2019

(86) PCT No.: PCT/FR2019/052021
§ 371 (c)(1),
(2) Date: Mar. 9, 2021

(87) PCT Pub. No.: WO2020/053502
PCT Pub. Date: Mar. 19, 2020

(65) Prior Publication Data
US 2021/0339877 A1 Nov. 4, 2021

(30) Foreign Application Priority Data
Sep. 12, 2018 (FR) ...................... 1858172

(51) Int. Cl.
*B64D 27/02* (2006.01)
*B60L 50/60* (2019.01)
(Continued)

(52) U.S. Cl.
CPC .............. *B64D 27/02* (2013.01); *B60L 50/60* (2019.02); *B60L 53/00* (2019.02); *B60L 53/24* (2019.02);
(Continued)

(58) Field of Classification Search
CPC ........ B64D 27/02; B64D 27/10; B64D 27/24; B64D 31/00; B64D 2027/026;
(Continued)

(56) References Cited

U.S. PATENT DOCUMENTS 6,624,533 B1   9/2003 Swanson et al.
9,711,983 B2 * 7/2017 Winger .................... G06F 1/266
(Continued)

FOREIGN PATENT DOCUMENTS

CA     2531428 C  * 1/2012  ............. F01D 15/10
CN   102725195 A    10/2012
(Continued)

OTHER PUBLICATIONS

Mahepa(doc. "D1.1: Concept of Modular Architecture for Hybrid Electric Propulsion of Aircraft") (Year: 2017).*
(Continued)

*Primary Examiner* — Assres H Woldemaryam
(74) *Attorney, Agent, or Firm* — Bookoff McAndrews, PLLC

(57) ABSTRACT

Series hybrid propulsion unit including a gas turbine driving a mechanical shaft of an electric generator having n output phases and supplying an AC busbar, and a system for monitoring the speed of the gas turbine, the AC busbar supplying a plurality of AC distribution channels each composed of an electric rectifier and a battery sharing the power required to supply a DC bus, the DC bus in turn supplying a plurality of propulsion sub-channels composed of electric inverters supplying, under the monitoring of a control module, motors driving thrusters, further including a battery charger for charging the battery from the DC bus, a power management module delivering a power reference for the electric generator, and a hybridization rate management module monitoring the voltage of the DC bus, the battery (Continued)

being directly connected on the DC bus via a passive component and the electric rectifier being a passive converter.

9 Claims, 5 Drawing Sheets

(51) Int. Cl.
  *B60L 53/00* (2019.01)
  *B60L 53/24* (2019.01)
  *B60L 58/10* (2019.01)
  *B64D 27/10* (2006.01)
  *B64D 27/24* (2006.01)
  *B64D 31/00* (2006.01)

(52) U.S. Cl.
  CPC .............. *B60L 58/10* (2019.02); *B64D 27/10* (2013.01); *B64D 27/24* (2013.01); *B64D 31/00* (2013.01); *B60L 2200/10* (2013.01); *B60L 2210/10* (2013.01); *B64D 2027/026* (2013.01); *B64D 2221/00* (2013.01)

(58) Field of Classification Search
  CPC ..... B64D 2221/00; B64D 35/02; B60L 50/60; B60L 53/00; B60L 53/24; B60L 58/10; B60L 2200/10; B60L 2210/10; Y02T 10/70; Y02T 10/7072; Y02T 50/60; Y02T 90/14
  See application file for complete search history.

(56) References Cited

U.S. PATENT DOCUMENTS

| | | | |
|---|---|---|---|
| 2008/0179956 A1* | 7/2008 | Jiang | H04L 12/10 307/66 |
| 2015/0360775 A1* | 12/2015 | Arai | B64C 29/0066 244/12.1 |
| 2015/0367950 A1 | 12/2015 | Rajashekara et al. | |
| 2016/0039300 A1* | 2/2016 | Wang | B64D 27/24 244/58 |
| 2016/0359324 A1 | 12/2016 | Knowles et al. | |
| 2017/0057650 A1 | 3/2017 | Walter-Robinson | |
| 2017/0129617 A1 | 5/2017 | Shah et al. | |
| 2017/0133852 A1 | 5/2017 | MacDonald | |
| 2017/0320584 A1* | 11/2017 | Menheere | F02C 7/275 |
| 2020/0189731 A1* | 6/2020 | Mistry | B64F 3/02 |
| 2020/0290742 A1* | 9/2020 | Kumar | B64D 27/24 |
| 2021/0139154 A1* | 5/2021 | Klonowski | B64U 10/13 |

FOREIGN PATENT DOCUMENTS

| | | | | |
|---|---|---|---|---|
| CN | 104364155 A | | 2/2015 | |
| CN | 104670503 A | | 6/2015 | |
| CN | 108508732 A | * | 9/2018 | |
| DE | 202012012835 U1 | | 2/2014 | |
| EP | 2928068 A2 | * | 10/2015 | ............. B60L 11/02 |
| EP | 299555 A1 | | 3/2016 | |
| EP | 3228544 A1 | | 10/2017 | |
| EP | 3296212 A1 | | 3/2018 | |
| WO | WO-2012092401 A1 | * | 7/2012 | ............. B60W 10/06 |
| WO | WO-2017198678 A1 | * | 11/2017 | ............. B64D 41/00 |
| WO | WO-2018175349 A1 | * | 9/2018 | ......... B64C 29/0008 |
| WO | WO-2019021007 A1 | * | 1/2019 | ............. H02J 7/0029 |
| WO | WO-2019186042 A1 | * | 10/2019 | ............. B64C 27/08 |

OTHER PUBLICATIONS

Yilmaz (Doc. "Passive Full-Wave MOSFET Rectifiers for Electromagnetic Harvesting") (Year: 2013).*
International Search Report in corresponding Application No. PCT/FR2019/052021, dated Apr. 29, 2020 (2 pages).
French Search Report in corresponding Application No. FR 1858172, dated May 15, 2019 (2 pages).

* cited by examiner

HYBRID PROPULSION ASSEMBLY FOR AIRCRAFT

CROSS-REFERENCE TO RELATED APPLICATION(S)

This application is the U.S. national phase entry under 35 U.S.C. § 371 of International Application No. PCT/FR2019/052021, filed on Sep. 2, 2019, which claims priority to French Patent Application No. 1858172, filed on Sep. 12, 2018.

BACKGROUND OF THE INVENTION

The invention relates to electric propulsion dedicated to aircrafts and concerns more particularly the new architectures based on the series hybridization of electric power sources which allows multiplying the number of rotors and therefore potentially improving the robustness of aircrafts with respect to the rotor failures.

Series hybridization of electric power sources consists in combining a turbogenerator (gas turbine+electric generator) with a battery. This hybridization allows combining the performances of each of the sources and allows benefiting from a more secure system in the event of loss of one of the electric sources.

Conventionally and as shown in FIG. 7, a series hybrid propulsion unit 10 includes a gas turbine 12 (with free or connected turbine) driving the mechanical shaft of an electric generator 14 having n output phases and supplying an AC busbar 16, and a system for monitoring (measuring and controlling) the speed of the gas turbine 18 (fixed rotational speed N1). The AC busbar 16 supplies a plurality of AC distribution channels 20 each composed of an electric rectifier 22 of the controlled rectifier type supplying a DC bus 24, of an electric storage or dissipation device 26 that allows managing the releases of charges (DC bus voltage limitation), of a battery 28 in series with a reversible DC/DC converter 30 that allows managing the charging and discharging of the battery and supplies the DC bus 24 in parallel with the electric rectifier 22. The DC bus 24 in turn supplies a plurality of propulsion sub-channels composed of electric inverters 32 supplying, under the action of a thrust control module 34, the motors 36 driving the propellers of the aircraft 38.

The problem with such architecture is that the reversible DC/DC converter is necessarily overdimensioned. Indeed, the latter manages the charging and discharging of the battery but also the rate of hybridization between the battery and the electric generator, which shares the power required to supply the DC bus. The converter is therefore dimensioned relative to the discharge power to be provided, that is to say the power of the thrusters (or a large part of this power), which, for example for a Li-ion battery, represents from three to six times the battery recharging power. The converter is therefore overdimensioned and its weight and volume strongly impact the weight of the aircraft and consequently the transportable load.

OBJECT AND SUMMARY OF THE INVENTION

The present invention therefore proposes new architecture of a series hybrid propulsion unit for an aircraft overcoming the aforementioned drawbacks.

This aim is achieved with a series hybrid propulsion unit including a gas turbine driving a mechanical shaft of an electric generator having n output phases and supplying an AC busbar, and a system for monitoring the speed of the gas turbine, said AC busbar supplying a plurality of AC distribution channels each composed of an electric rectifier and of a battery sharing the power required to supply a DC bus, said DC bus in turn supplying a plurality of propulsion sub-channels composed of electric inverters supplying, under the monitoring of a control module, motors driving thrusters, which unit being characterized in that it further includes:

a battery charger for charging said battery from said DC bus, a power management module delivering a power reference for said electric generator, a hybridization rate management module for managing the power sharing between said electric generator and said battery by monitoring the voltage of said DC bus, and in that said battery is directly connected on said DC bus via a passive component and said electric rectifier is a passive converter (not controlled).

Advantageously, said passive component is formed of a single diode and said passive converter is formed of a single diode bridge. Said battery charger is formed by a single non-reversible DC/DC converter.

Thus, by using a diode for the discharging of the battery and a non-reversible DC/DC converter, dedicated and dimensioned only for the charging of the battery, it is possible to reduce the single diode bridge electric rectifier and to optimize the connection of the battery on the DC bus whose voltage monitoring further allows effectively monitoring the hybridization rate.

According to the envisaged embodiment, the unit includes an autonomous device for limiting the voltage of the DC bus or said battery charger forms a device for limiting the voltage of the DC bus while also ensuring a management of the releases of charges.

According to a particular embodiment, said hybridization rate management module is configured to monitor said DC bus voltage via the speed of rotation of said electric generator or via the output voltage of said electric generator. When the electric generator is a wound rotor generator, said output voltage is monitored via the excitation current imposed at the rotor of said electric generator.

BRIEF DESCRIPTION OF THE DRAWINGS

The invention will be better understood upon reading the description given below by way of indication but without limitation with reference to the following figures in which.

DETAILED DESCRIPTION OF EMBODIMENTS OF THE INVENTION

The invention more particularly finds application in propulsion applications of the VTOL (Vertical Take Off & Landing) type where each thruster is associated with a converter.

Figure 1:
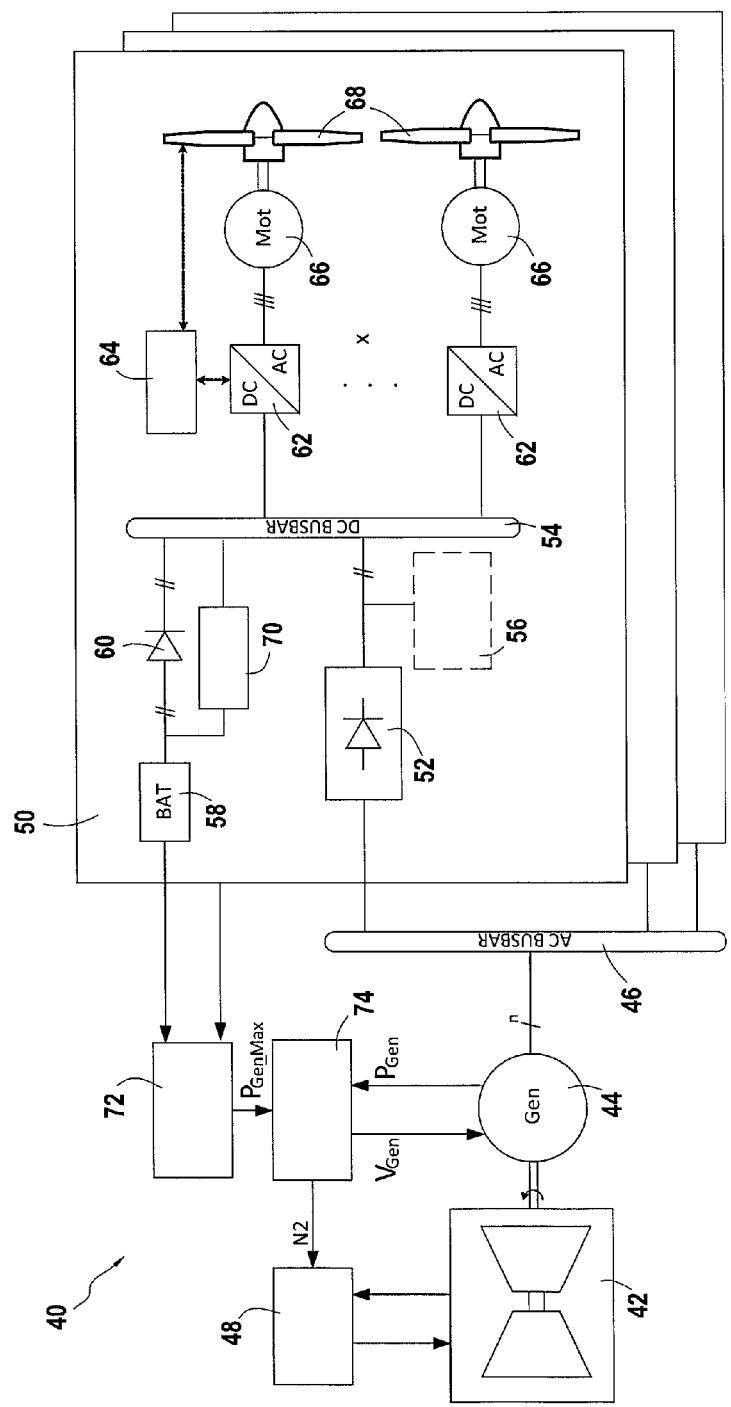
FIG. 1 is a block diagram of a series hybrid propulsion unit according to the invention.

FIG. 1 shows a series hybrid propulsion unit 40 in accordance with the invention and including a gas turbine 42 (with free or connected turbine) driving the mechanical shaft of an electric generator 44 having n output phases and supplying an AC busbar 46, and a system for monitoring (measuring and controlling) the speed of the gas turbine 48. The AC busbar 46 supplies a plurality of AC distribution channels 50 each composed of an electric rectifier 52, which is a passive converter formed of a single diode bridge supplying a DC bus 54, optionally of an autonomous electric storage or dissipation device 56 that allows managing releases of charges (DC bus voltage limitation), of a battery 58 directly connected on the DC bus via a single diode 60, which is a passive component by allowing its discharging. The DC bus 54 in turn supplies a plurality of propulsion sub-channels composed of electric inverters 62 supplying, under the action of a thrust control module 64, motors 66 driving propellers of the aircraft (thrusters 68).

According to the invention, this series hybrid propulsion unit also includes a battery charger 70 formed of a single non-reversible DC/DC converter, dedicated to the charging of the battery and connected to the DC bus 54, a power management module 72 and a hybridization rate management module 74.

The power management module 72 defines a power reference $P_{Gen\_Max}$ to be provided by the generator 44 from the State-Of-Charge (SOC) of the battery and other useful information such as altitude, speed, temperature, location, fuel reserves, etc . . . , which allows power sharing between the generator and the battery 58. This maximum reference power is provided to the hybridization rate management module 74 which will monitor the voltage of the DC bus 54 in order to monitor the rate of discharge of the battery and therefore manage this power sharing between generator and battery. If the DC bus voltage is greater than the battery voltage, then the battery cannot be discharged, the diode 60 being blocked. On the contrary, if the DC bus voltage is lower than the battery voltage, then the battery will provide power, the diode 60 then being on. The battery can be recharged via the dedicated battery charger 70.

The voltage of the DC bus 54 can be monitored according to two distinct embodiments either by the monitoring of the speed of rotation of the electric generator (and therefore the output speed of the gas turbine) or by the monitoring of the alternating output voltage of this electric generator.

Figure 2:
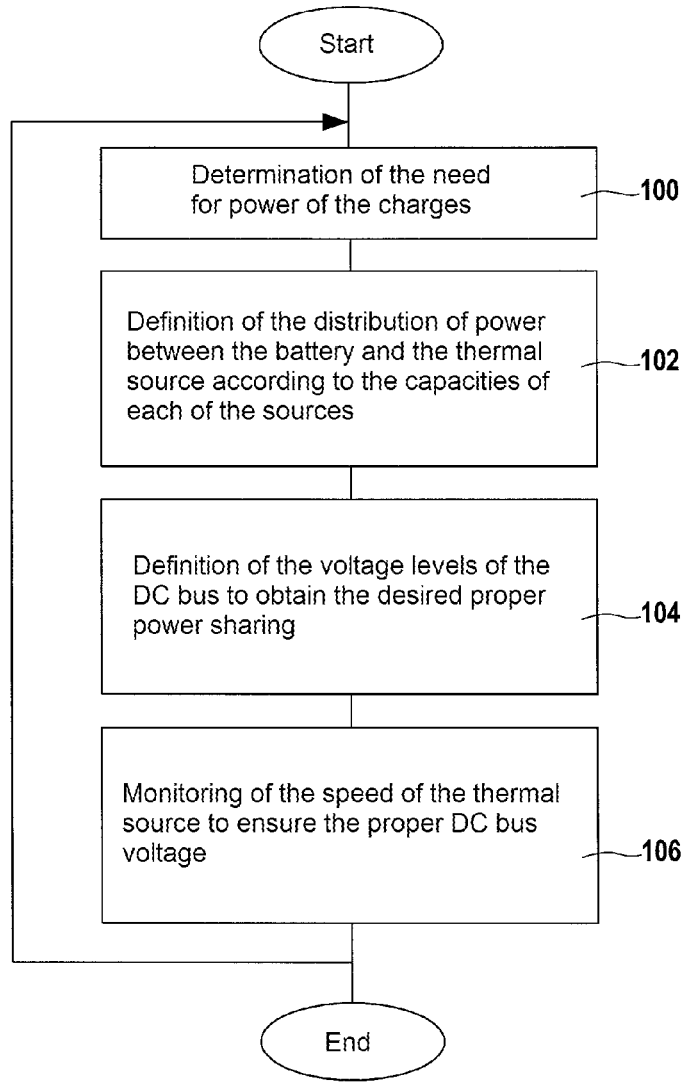
FIG. 2 is a logical diagram of the hybridization rate monitoring via the output speed of the gas turbine.

FIG. 2 illustrates by a logical diagram the strategy of monitoring the hybridization rate by the monitoring of the output speed of the gas turbine which can be described by the following steps.

In a first step 100, the hybridization rate management module 74 determines the need for power of the different charges, then in a step 102 the distribution of power between the battery and the thermal source according to the capacities of each of them is defined by the hybridization rate management module 74. The voltage level of the DC bus is then defined in a following step 104 by the hybridization rate management module 74 to obtain the desired power sharing and the monitoring of the speed of the thermal source is ensured in a final step 106 by the hybridization rate management module 74 to ensure that this DC bus voltage is indeed the one desired.

Indeed, when using a permanent magnet generator (or a generator with constant rotor flux), the following equation can be written as a first approximation:

$$V_{dc\_busbar} = k_{\_gen} * \omega * k_{\_rectifier}$$

With $V_{dc\_busbar}$ the DC Bus voltage,
$k_{\_gen}$, the coefficient linked to the generator,
$\omega$, the rotational speed of the generator,
$k_{\_rectifier}$, the gain linked to the electric rectifier.

The parameters k can be considered as constants, the speed w therefore allows monitoring the voltage of the DC bus and consequently the rate of discharge of the battery.

Figure 3:
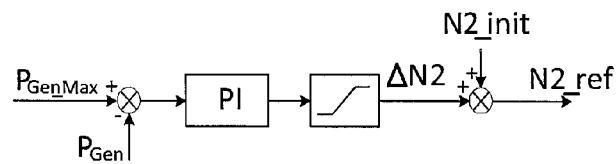
FIG. 3 illustrates an exemplary embodiment of the monitoring of FIG. 2 by the regulation of the speed of the gas turbine.

FIG. 3 shows an example of implementation at the hybridization management module 74 of the hybridization strategy using the method of FIG. 2, N2 being the speed of the gas turbine and of the electric generator and $P_{Gen\_Max}$ the maximum reference power to be provided by the generator. In this case, the reference N2_ref will lead directly to a DC bus voltage. The speed N2 is determined to limit the power provided by the gas turbine, it being understood that the battery will naturally provide the rest to the charges. Thus, when the voltage of the generator drops (equivalent to speed N2), the generator provides less power and the battery compensates for the difference in relation to the needs of the charges. On the other hand, when the voltage of the generator rises, the power of the latter increases limiting the use of the battery.

Figure 4:
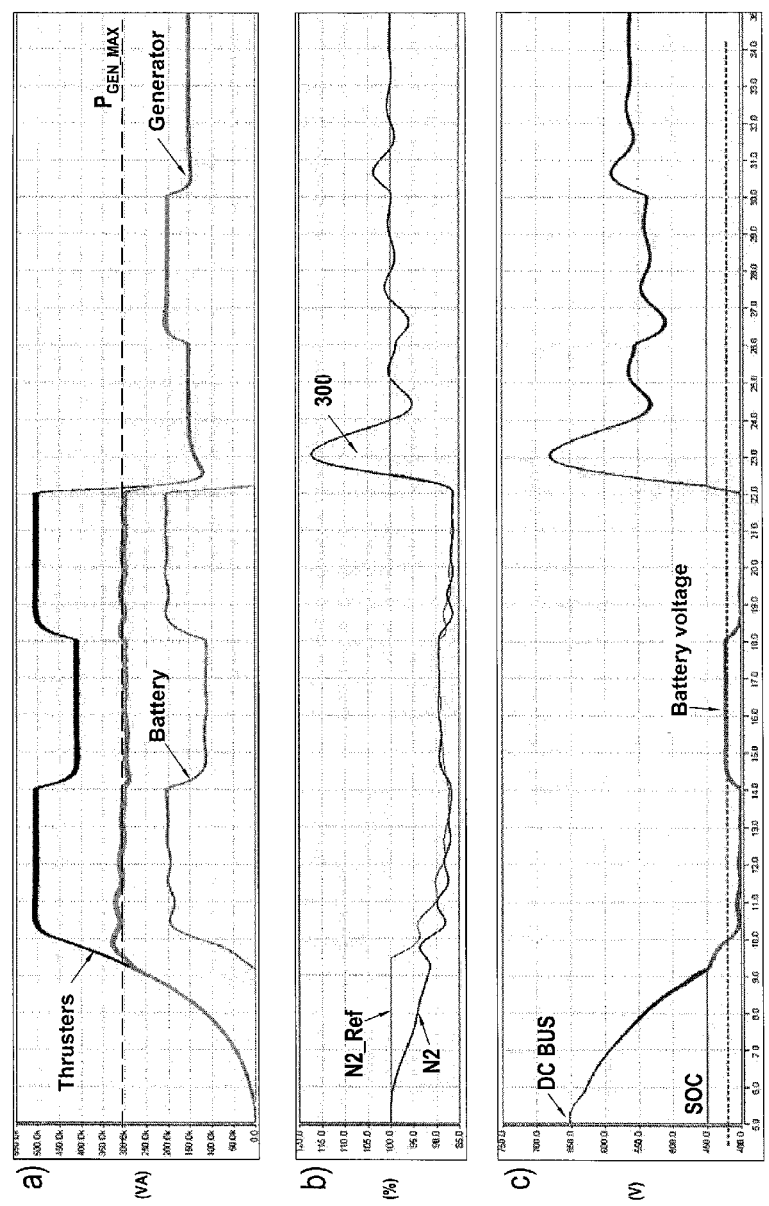
FIG. 4 shows the different waveforms at characteristic points of the propulsion unit of FIG. 1.

FIG. 4 shows different waveforms that can be observed within the propulsion unit of the invention. FIG. 4a shows the different powers provided to the thrusters 68, to the battery 58 and to the electric generator 44 as well as the limitation of the latter by the power management module 72 to the maximum power $P_{Gen\_Max}$. FIG. 4b shows the speed of the electric generator and the reference speed N2_ref and the need for a dissipation device (autonomous device 56 or battery charger 70) can be noted in 300 to avoid the overspeeds of the gas turbine 42. FIG. 4c shows the DC bus voltage and that of the battery.

Figure 5:
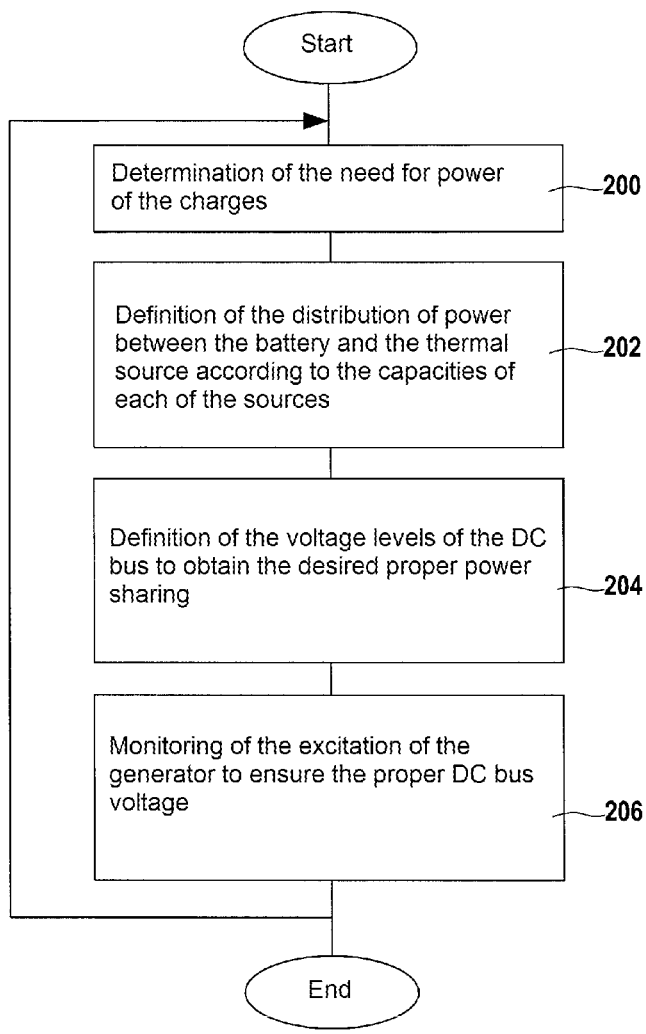
FIG. 5 is a logical diagram of the hybridization rate monitoring via the output voltage of the generator.

FIG. 5 illustrates by a logical diagram the strategy of monitoring the hybridization rate by the monitoring of the output voltage of the electric generator which can be described by the following steps.

In a first step 200, the hybridization rate management module 74 determines the need for power of the different charges, then in a step 202 the distribution of power between the battery and the thermal source according to the capacities of each of them is defined by the hybridization rate management module 74. The voltage level of the DC bus is then defined in a following step 204 by the hybridization rate management module 74 to obtain the desired power sharing and the monitoring of the excitation of the electric generator is ensured in a final step 206 by the hybridization rate management module 74 to ensure that this DC bus voltage is indeed the one desired.

When using a wound rotor generator, the output voltage can be monitored via the excitation current imposed at the rotor of the machine. The following equation can be written as a first approximation:

$$V_{dc\_busbar} = k_{\_gen} * \omega * I_{exc} * k_{\_rectifier}$$

With $V_{dc\_busbar}$ the DC Bus voltage,
$k_{\_gen}$, the coefficient linked to the generator,
$\omega$, the rotational speed of the generator,
$I_{exc}$, the excitation current, $k\_{rectifier}$, the gain linked to the electric rectifier.

Since the parameters k and ω can be considered as constant, the excitation current $I_{exc}$ therefore allows monitoring the voltage of the DC bus and consequently the battery discharge rate.

Figure 6:
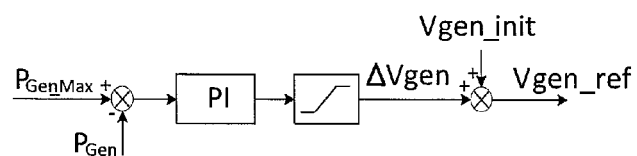
FIG. 6 illustrates an exemplary embodiment of the monitoring of FIG. 4 by the regulation of the voltage of the generator.
Figure 7:
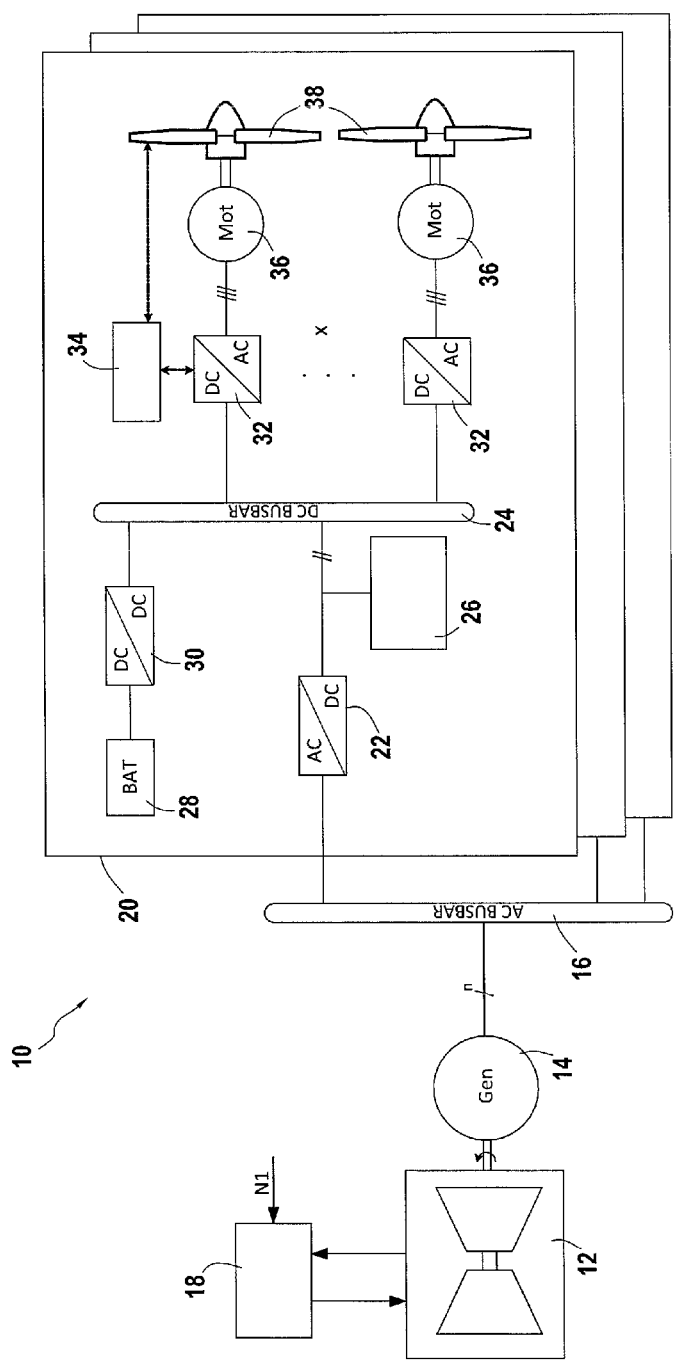
FIG. 7 is a block diagram of a series hybrid propulsion unit according to the prior art.

FIG. 6 shows an example of implementation at the hybridization management module 74 of the hybridization strategy using the method of FIG. 5, Vgen being the voltage across the electric generator and as previously $P_{Gen\_Max}$ the maximum power that can be provided by the generator. In this case, the reference Vgen_ref will directly lead to a DC bus voltage. It is determined to limit the power provided by the gas turbine, it being understood that as previously the battery will naturally provide the rest to the charges. And as previously, when the voltage of the generator drops, the generator provides less power and the battery compensates for the difference in relation to the need for the charges. On the other hand, when the voltage of the generator rises, the power of the latter increases limiting the use of the battery.

With a battery connected via a single passive component for its discharge, the invention is nevertheless capable of hybridizing this battery indirectly with the electric generator by a voltage monitoring of the electric source composed of the thermal machine, of this electric generator and of the passive converter. The hybridization monitoring is therefore carried out without using controllable power electronics (with the exception of the battery recharging) as required by the prior art. In addition, when the propulsion unit does not include a specific device for releasing charges, the battery charger can also perform the function of limiting the DC bus voltage.

This indirect hybridization capacity by monitoring of a bus voltage by the electric source while the battery is connected with passive components is particularly innovative in view of the state of the art.

The invention claimed is:

1. A series hybrid propulsion unit including a gas turbine driving a mechanical shaft of an electric generator having n output phases and supplying an alternating current busbar, and a system for monitoring the speed of the gas turbine, said alternating current busbar supplying a plurality of alternating current distribution channels each composed of an electric rectifier and a battery sharing the power required to supply a direct current bus, said direct current bus in turn supplying a plurality of propulsion sub-channels composed of electric inverters supplying, under the monitoring of a control module, motors driving thrusters, wherein said series hybrid propulsion unit further includes:
   a battery charger for charging said battery from said direct current bus, wherein the battery charger is a single non-reversible direct current to direct current converter,
   a power management module delivering a power reference for said electric generator,
   a hybridization rate management module for managing the power sharing between said electric generator and said battery by monitoring the voltage of said direct current bus,
   and in that said battery is directly connected on said direct current bus via a passive component and said electric rectifier is a passive converter.

2. The series hybrid propulsion unit according to claim 1, wherein said passive component is formed of a single diode.

3. The series hybrid propulsion unit according to claim 1, wherein said passive converter is formed of a single diode bridge.

4. The series hybrid propulsion unit according to claim 1, wherein the series hybrid propulsion unit further includes an autonomous device for limiting the voltage of the direct current bus.

5. The series hybrid propulsion unit according to claim 1, wherein said battery charger forms a device for limiting the voltage of the direct current bus while also ensuring a management of the releases of charges.

6. The series hybrid propulsion unit according to claim 1, wherein said hybridization rate management module is configured to monitor said direct current bus voltage via the speed of rotation of said electric generator.

7. The series hybrid propulsion unit according to claim 1, wherein said hybridization rate management module is configured to monitor said direct current bus voltage via the output voltage of said electric generator.

8. The series hybrid propulsion unit according to claim 7, wherein the electric generator is a wound rotor generator, wherein said output voltage is monitored via an excitation current imposed at a rotor of said electric generator.

9. The series hybrid propulsion unit according to claim 1, wherein said thrusters are propellers of an aircraft.

* * * * *